United States Patent [19]

Caponigro et al.

[11] 4,359,502
[45] Nov. 16, 1982

[54] METHOD FOR JOINING HEAT-RECOVERABLE SHEET MATERIAL AND RESULTING ARTICLE

[75] Inventors: Dennis A. Caponigro, Pleasanton; Eugene F. Lopes, Sunnyvale, both of Calif.

[73] Assignee: Raychem Corporation, Menlo Park, Calif.

[21] Appl. No.: 90,490

[22] Filed: Nov. 1, 1979

Related U.S. Application Data

[60] Division of Ser. No. 953,682, Oct. 23, 1978, Pat. No. 4,200,676, which is a continuation of Ser. No. 664,275, Mar. 5, 1976, abandoned.

[51] Int. Cl.³ .......................... B32B 7/00; B32B 7/10
[52] U.S. Cl. ................................ 428/251; 204/159.17; 428/192; 428/245; 428/246; 428/343; 428/345; 428/354; 428/355
[58] Field of Search ............ 428/67, 68, 192, 246, 428/251, 262, 268, 138, 247, 256, 343, 345, 354, 355; 525/132, 206; 204/159.16, 159.17; 156/110 A, 330

[56] References Cited

U.S. PATENT DOCUMENTS

| | | | |
|---|---|---|---|
| 3,086,242 | 4/1963 | Cook | 264/230 |
| 3,770,556 | 11/1973 | Evans et al. | 156/218 |
| 4,087,505 | 5/1978 | Sugimoto et al. | 525/206 |
| 4,127,545 | 11/1978 | Callon et al. | 525/206 |
| 4,146,512 | 3/1979 | Weaver et al. | 525/133 |
| 4,181,775 | 1/1980 | Corke | 428/36 |
| 4,199,646 | 4/1980 | Hori et al. | 525/132 |

*Primary Examiner*—James J. Bell
*Attorney, Agent, or Firm*—Lyon & Lyon

[57] ABSTRACT

The ends of heat-recoverable polymeric sheet material are joined by overlapping the ends and bonding them together by means of a laminar panel comprising a layer of a crosslinked hot-melt adhesive coated on one surface of a reinforced polymer layer. The panel has a width approximately that of the sheet material being joined. The panel is disposed, adhesive side down, so that approximately half of its adhesive coated surface contacts the sheet material on either side of the line defined by the uppermost of the overlapping ends. The panel is heated to activate the adhesive and form a secure bond joining the ends. Heat-recoverable sleeves can be made by joining the opposing ends of a single length of heat-recoverable sheet material.

16 Claims, 6 Drawing Figures

METHOD FOR JOINING HEAT-RECOVERABLE SHEET MATERIAL AND RESULTING ARTICLE

This is a division of application Ser. No. 953,682, filed Oct. 23, 1978 now U.S. Pat. No. 4,200,676 which is a continuation of Ser. No. 664,275, filed Mar. 5, 1976, abandoned.

FIELD OF THE INVENTION

This invention relates to heat-recoverable articles. More specifically, it relates to a method for joining the ends of heat-recoverable polymeric sheet material and the resulting product. In another aspect, it relates to heat-recoverable polymeric sleeves and the method by which they are made.

BACKGROUND OF THE INVENTION

Sleeves of thin walled polymeric materials are frequently used to protect articles, particularly those having a tubular or otherwise regular elongated configuration. Another use for such sleeves is to seal the joint between links of pipe or other conduit. Of particular utility for these purposes are heat-recoverable sleeves, i.e., sleeves that possess the property of being able to shrink to a smaller diameter when heated. Such a sleeve is constructed with a diameter large enough so that it can be conveniently placed about a substrate whereupon it is heated causing it to shrink and closely conform to that substrate.

Materials suitable for making heat-recoverable sleeves are well known. In Cook U.S. Pat. No. 3,086,242, the disclosure of which is incorporated herein by reference, there is described a variety of suitable materials obtained by crosslinking, particularly by radiation, organo polymeric precursors.

Sleeves of relatively small diameter are conveniently made by extrusion directly from the aforementioned materials. However, such is not the case with sleeves of large enough diameter to be used to cover sections of a pipe that might be employed in pipelines for the transmission of oil or gas over long distances. Because of this difficulty, it has been the practice in the past to employ so-called "wrap around" sleeves in combination with large diameter pipe. Sleeves of this type are made by wrapping a length of heat-recoverable material about the substrate, for example, a joint between two links of pipe, and joining its ends by a mechanical means that prevent the ends from separating when the sleeve is subjected to heat to occasion its recovery. Wrap around sleeves have the added advantage of not requiring access to a free end of the substrate in order to accomplish installation. Examples of such sleeves are described in the following U.S. patents, the disclosures of which are incorporated by reference:

Conde: No. 3,379,218
Ellis: No. 3,455,326
Wilson: No. 3,530,898
Muchmore: No. 3,542,077
Tanaka: No. 3,574,313

In Evans et al, U.S. Pat. No. 3,770,556, a method of making a wrap around sleeve is described in which the ends are overlapped and a contact adhesive is disposed between the overlapping ends to hold them together prior to recovery of the sleeve. Optionally, a layer of material can be applied to outside of the wrap around sleeve to prevent peelback. This layer, which can be a laminate of glass cloth and polyethylene, is also adhered to the sleeve by means of the contact adhesive.

The technique of using a contact adhesive, though quite useful, suffers from the drawback that a solvent based adhesive must be applied in the field by brushing, spraying, rolling or dipping and then permitted to dry to a relatively tack free film prior to placing the sleeve around the pipe to be covered if the sheet material is cut to size in the field. If applied at the factory, the material must be cut to a predetermined length thus limiting the range of sizes available. Furthermore, in many instances, the sleeve material has a coating of a mastic or adhesive which is used to improve the contact of the sleeve with the substrate and fill any voids. If this is the case, the mastic must be removed from the end of the sheet which is to be overlapped at the joint if the sleeve is fabricated in the field. This can be a time consuming task as well. Thus, it can be seen, that there remains a need for a simple method of making joints and wrap around sleeves for field installation.

OBJECTS OF THE INVENTION

One object of this invention is to provide an improved method of making a wrap around heat-recoverable sleeve.

Another object of this invention is to provide a method for making wrap around heat-recoverable sleeves that can be conveniently carried out in the field.

Another object of this invention is to provide a novel wrap around heat-recoverable sleeve.

The accomplishment of these and other objects will be apparent to those skilled in the art from the following description of the invention.

SUMMARY OF THE INVENTION

According to the present invention, the ends of heat-recoverable sheet material are joined by overlapping the ends of the material and disposing a laminar panel over the line defined by the uppermost of the ends being joined. The laminar panel comprises a layer of a cross-linked hot-melt adhesive coated on one surface of a reinforced polymer layer. In a presently preferred embodiment, the reinforcement comprises a layer of glass cloth. In a particularly preferred embodiment, the layer of glass cloth is sandwiched between two layers of polymer. The laminar panel is heated to activate the adhesive whereby a bond is formed between the overlapping sheets secure enough to withstand the forces of recovery when the sheet material is heated to cause recovery. In a particularly preferred embodiment of the present invention, the ends of the sheet material being joined are opposite ends of a single length of heat-recoverable sheet material joined to form a sleeve.

DETAILED DESCRIPTION OF THE INVENTION

Figure 1:
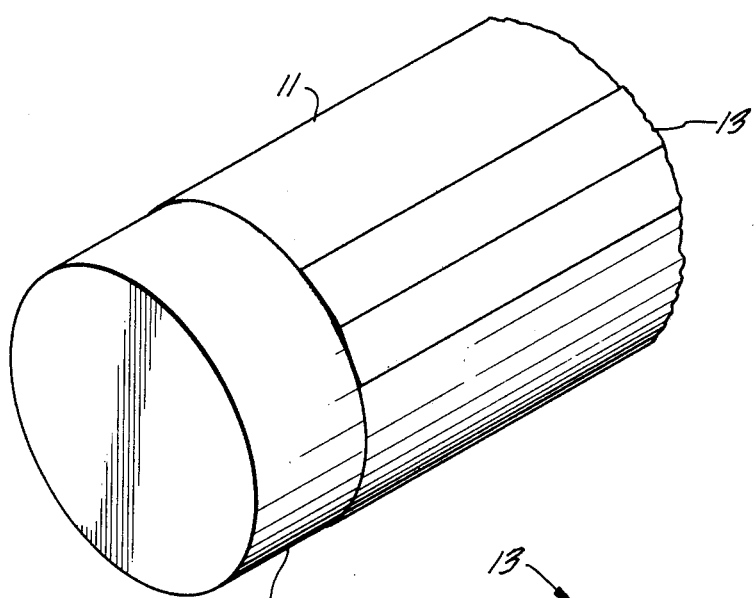
FIG. 1 is a perspective view of a wrap around sleeve made in accordance with the present invention after its recovery about a substrate.

According to the present invention, ends of polymeric heat-recoverable sheet material can be joined to form, for example, a longer length of material from two or more lengths of heat-recoverable sheet material. However, in a preferred application of the present invention, the opposing ends of a length of heat-recoverable sheet material can be joined to form a heat-recoverable sleeve.

A polymeric heat-recoverable material is a dimensionally heat unstable material frequently said to possess "elastic memory". Sheet material that will exhibit this phenomenon can be obtained by heating a sheet of a suitable crosslinked thermoplastic polymer above its crystalline melting point and elongated or expanding it in one or more directions followed by allowing the sheet to cool below the crystalline melting temperature while in its deformed condition. Once cooled, the sheet will retain its new dimensions. However, if once again heated, but without restraint, to a temperature above the crystalline melting point of the polymer the sheet will recover its original dimensions thereby exhibiting its elastic memory. Heat-recoverable material that is used for making heat-recoverable sleeves is preferably expanded in but a single direction.

In its heat-unstable elongated form, the sheet material is said to be heat-recoverable or heat-shrinkable. A polymer suited for use in such applications can be said to be "capable of being rendered heat-recoverable". Crystalline polymeric materials that have been crosslinked by chemical means, for example, by means of a thermally activated organic peroxide of the type well known to the art, or by exposure to ionizing radiation such as high energy electrons or nuclear radiation are preferred for use in this invention. They represent a preferred class of polymers capable of being rendered heat-recoverable although other such polymers are known and would also be useful in the present invention.

The polymers suited for use in this invention are of many types and include, e.g., polyolefins, saturated and unsaturated polyesters and polyvinyl halides, etc. Also useful are elastomers such as natural rubber, butadiene-styrene copolymers, butadiene-acrylonitrile copolymers, isoprene-isobutylene copolymers, polyisoprene, polybutadiene, polychloroprene, polysiloxanes, polymerized fluorocarbons (e.g., Viton), chlorosulfonated polyethylene (Hypalon), plasticized polyvinylchloride, and polybutene, etc. Most preferred are the polyolefins, e.g., polyethylene, polypropylene, poly(butene-1), various copolymers of ethylene, propylene and butene, ethylene-ethylacrylate, ethylene-vinylacetate, or ethylene-methacrylate copolymers in which repeat units derived from the ethylene comonomer predominate (e.g., about 80–90%), and blends of such copolymers containing major portions of polyethylene itself. A method for reducing such polymeric materials heat-recoverable is described in Cook, U.S. Pat. No. 3,086,242, previously referred to and incorporated by reference.

As previously noted, the preferred polymeric sheet material to be joined is crosslinked. Preferably it exhibits modulus in the range from about 10–100 p.s.i. As used herein, the term "modulus" connotes modulus determined at 150° C. and 100% elongation. Articles to be joined are preferably crosslinked by high energy ionizing radiation at dosage levels ranging from, e.g., about 5 to about 50 megarads, preferably from about 5 to 30 megarads.

The invention finds its preferred application in the joinder of thin-walled sheet material (e.g., sheet ranging in thickness from about 10 to about 120 mils). Sheet material is "thin-walled" for present purposes when its thickness is substantially less than its length or width. The present invention has proven ideally suited to joining heat-recoverable polymeric sheet to form sleeves whose recovered diameter is equal to or greater than about 12 inches, and commonly equal to or greater than about 18 inches.

With reference now to the drawings, the present invention will be described in more detail as it would be applied to the making of a heat-recoverable sleeve from a length of heat-recoverable material as described above by joining the opposite ends. In FIG. 1, there is shown a sleeve 11 disposed and recovered about a substrate 12. The substrate might be a length of pipe formed by the union of two shorter sections of pipe with the sleeve recovered about the pipe at the union (not shown) to improve the seal or to provide environmental protection. Alternatively, the sleeve may have been recovered over an area on the pipe where a rupture or puncture has occurred which has been repaired, the sleeve again providing additional sealing and/or environmental protection.

The sleeve is made by wrapping a length of heat-recoverable material about the substrate and joining its ends by means of panel 13. The panel used in this invention has a laminar structure, a presently preferred form of which is shown in cross-section in FIG. 2, and comprises a crosslinked hot-melt adhesive layer 18 coated on one surface of a reinforced polymeric layer 14.

The polymer used for the reinforced layer can be selected from a wide variety of types. Preferably it should be crosslinked to give it stability above its melting point. It may be crosslinked by either chemical means or by exposure to ionizing radiation of the type previously described for the preparation of the heat-recoverable sheet material. If not crosslinked, the polymer should have a melting point well above the recovery temperature of the polymer forming the heat-recoverable sleeve in order that it not melt by reason of the application of heat to form the bond joining the sheet ends or to cause recovery of the sleeve. Suitable polymers include, among others, polyamides, polyolefins, polyvinyl halides, polyaryl ketones, polyfluorocarbons (such as polyvinylidenefluoride). It is presently preferred to use polyethylene for this purpose.

The reinforcing member used with the polymeric layer provides the panel with structural stability. It may be, for example, a metal foil bonded to the polymer layer. The reinforcing layer prevents distortion of the panel by the recovery forces of the sleeve. It also allows the panel to be relatively thin thereby improving its resistance to peel.

The preferred reinforcement for use in combination with the polymer layer is a foraminous member, for example, a length of woven cloth or other mesh material. The foraminous member can be fabricated from a wide variety of materials so long as the resulting member is capable of retaining its structural integrity during the bonding process. Woven glass cloth is the presently preferred material for the foraminous member. However, scrim or cloth material woven from metal strands, mineral fibers or organic fibers may also be employed.

If an organic fiber is used, it should be high melting enough to resist the temperatures to which it will be exposed during the formation of the bond or the subsequent heating of the sleeve to cause its recovery.

The adhesive used in the adhesive layer of the laminar panel is a crosslinked hot-melt adhesive comprising a mixture of a normally adhesive heat-softenable polymer and an aromatic tackifier. The preferred adhesive polymers are copolymers of ethylene and one or more monoolefinically unsaturated polar comonomers. Suitable comonomers include monoolefinically unsaturated organic esters and acids copolymerizable with ethylene. Among suitable unsaturated esters are the vinyl esters of alkanoic and aromatic acids including, but not limited to, vinyl acetate, vinyl propionate, vinyl butyrate, vinyl isobutyrate, vinyl benzoate and the like. Alkyl and aryl esters of monoolefinically unsaturated acids are also useful. They include, but are not limited to, methylacrylate, ethyl acrylate, methyl methacrylate, ethyl methacrylate, n-butyl acrylate, phenyl acrylate, methyl crotonate, ethyl crotonate and the like. Suitable unsaturated acids include acrylic and methacrylic acid. Applicable copolymers include those of ethylene with one or more of the aforementioned monomers. Particularly preferred copolymers are those of ethylene and vinyl acetate, terpolymers of ethylene with vinyl acetate and either acrylic or methacrylic acid. A particularly preferred copolymer is a polymer of ethylene and ethyl acrylate. One such suitable adhesive copolymer is a copolymer of ethylene and ethyl acrylate sold under the trade name DPD 6181 by the Union Carbide Corporation.

The tackifiers useful in the present invention are preferably selected from so-called "aromatic tackifiers". Such tackifiers are well known to those skilled in the art. An aromatic tackifier may be characterized as one comprised of aromatic moieties. Among such tackifiers may be mentioned phenolic and phenol modified resins, copolymers of styrene and vinyl-toluene, halogenated polyphenyls and, the presently preferred phenol modified coumaroneindene resin sold under the trade name Nevillac Hard by Nevill Chemical Company.

The tackifier should be used in an amount sufficient to provide enough tack to the adhesive so that it will adequately wet the heat-recoverable sheet material. Therefore, normally the tackifier will comprise from about 5-40% by weight of the adhesive mixture. Amounts of tackifier less than about 5% tend to produce a poor adhesive bond. Amounts of tackifier in excess of about 40% give an adhesive which tends to exhibit inferior peel strength. Preferably, the tackifier will comprise from about 10-30% by weight of the adhesive mixture. Small amounts of anti-oxidants may also be included in the adhesive composition. Furthermore, inasmuch as the adhesive composition is ultimately crosslinked, small amounts of a crosslinking adjuvant may also be included. Since it is preferred to employ ionizing radiation as the crosslinking means, the adjuvant should be one of the well known "prorads." A prorad is a compound which promotes crosslinking by radiation. Such compounds are well known to those skilled in the art and include, for example, triallylisocyanurate and, N, N'-m-phenylene-dimaleimide.

For use in the present invention, the adhesive is crosslinked with ionizing radiation as previously described for the crosslinking of the heat-recoverable polymer. Normally, a radiation dosage of from 5-30 megarads is employed for the presently preferred adhesive composition set forth below. A dosage below about 5 megarads results in adhesives that are unduly mobile at recovery temperatures. Radiation in excess of 30 megarads may reduce the tackiness of the adhesive to levels which are ineffective to provide adequate peel strength. The preferred dosage is 10-20 megarads.

A presently preferred adhesive for use in this invention has the following composition:

| Material | % By Weight |
| --- | --- |
| DPD 6181 | 72.82% |
| Novillac Hard | 24.27% |
| Irganox 1010 (an anti-oxidant) | 1.94% |
| Triallylisocyanurate (a prorad) | 0.97% |

Figure 2:
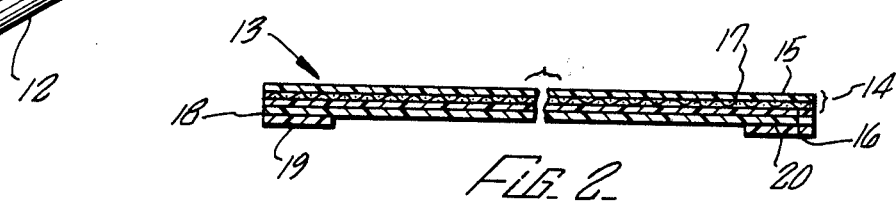
FIG. 2 is a view in cross-section of a laminar panel used in the present invention.

The construction of a preferred laminar panel for use in this invention is illustrated in FIG. 2 wherein reinforced polymer layer 14 is comprised of sublayers 15 and 16 of a polymeric material, for example, polyethylene. Disposed between these layers is a layer of reinforcing material 17, preferably a layer of glass cloth. Layer 18 is a layer of adhesive.

The assemblage comprising the reinforced polymer layer 14 is formed by laminating the sublayers 15 and 16 of polyethylene and glass cloth 17 using heat and pressure when the polyethylene is in an uncrosslinked state. The uncrosslinked adhesive composition is then coated on one surface, typically from the melt. The resulting assemblage is then subjected to ionizing radiation to crosslink the polyethylene layers and the adhesive composition. As indicated above, typically 10-20 megarads of radiation is employed for this purpose. Optionally, the crosslinking can be achieved by incorporating a chemical crosslinking agent in the respective layers to be crosslinked. Typical crosslinking agents include the heat activated peroxides of the type well known to those skilled in the art.

As will be appreciated by those skilled in the art, other methods may be employed for making the reinforced layer than that described above. For example, the polymer used may be extruded about the reinforcement so that the reinforcement forms an integral part of the polymer layer. In appropriate cases, the layers of polymer may be bonded to each other in the reinforcement by means of a discrete adhesive such as a solvent activated or thermosetting adhesive. The thickness of the reinforced polymer layer is relatively unimportant. Preferably it is made as thin as possible to reduce the likelihood that outside forces such as an accidental blow will induce peeling. Good success has been had in the construction shown in FIG. 2 where the sublayers 15 and 16 are polyethylene layers 0.010 in. thick.

Referring again to FIG. 2, layers 19 and 20 represent layers of pressure sensitive or double sided pressure sensitive tape. These layers provide initial adhesion between the panel and the heat-recoverable sheet material to keep the assembly in its proper relationship during the formation of the bond between the panel and the sheet material through layer 18. The role of layers 19 and 20 will be more fully explained hereinafter. Whenever appropriate, these layers can be provided with a release paper for protection, particularly if factory installed. Optionally, they can be installed in the field, for example, from a roll of pressure sensitive adhesive after the laminar panel is cut to size.

Figure 3:
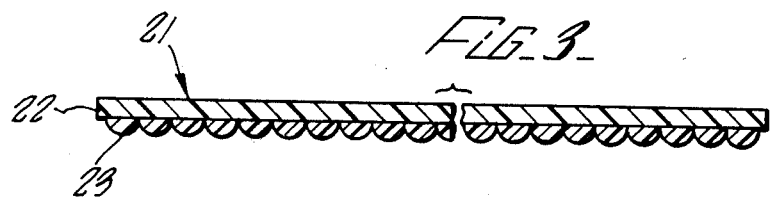
FIG. 3 is a view in cross-section of a mastic or adhesive coated heat-recoverable sheet material useful in the present invention.

FIG. 3 illustrates in cross-section a presently preferred construction for the heat-recoverable sheet material 21 used in this invention in which layer 22 is a layer of adhesive or mastic, preferably of the hot-melt type. When the sleeve is heated to occasion its recovery, the heat can cause the mastic layer to soften. Thus, when the sleeve recovers about the substrate the adhesive or mastic can improve the adherence of the sleeve to the substrate and fill voids and imperfections in the substrate or fill areas where there is imperfect conformance between the sleeve and substrate thereby eliminating or reducing the intrusion of water or other substances corrosive to the substrate.

Figure 4:
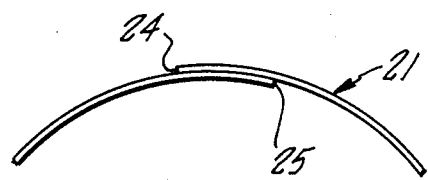
FIGS. 4, 5 and 6 illustrate the method of the present invention by which the ends of heat-recoverable material are joined.
Figure 5:
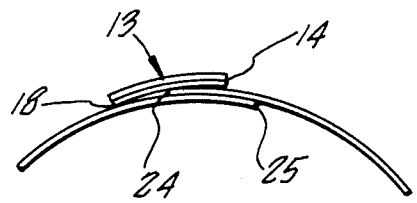
Figure 6:
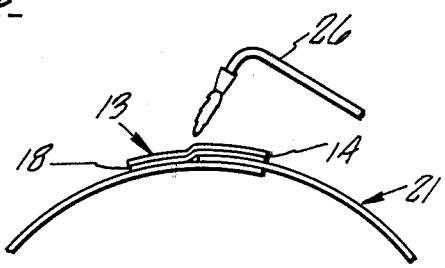

FIGS. 4, 5 and 6 illustrate the method by which the bond is made between the ends of heat-recoverable sheet material. As shown in FIG. 4, the ends 24 and 25 are overlapped. Then panel 13, preferably of substantially the same width of the sheet material 21 is approximately centered over the line formed by the exposed end 24 as shown in FIG. 5. The panel should be long enough to extend on either side of this line a sufficient extent so that the bond between the panel and sheet material, when made, will withstand the recovery force generated when the sheet material is heated to undergo recovery and shrinks about the substrate.

It will be appreciated that the length of the panel necessary to achieve this end may vary according to the amount of unresolved recovery remaining in the sleeve after its recovery about a substrate. Unresolved recovery is measured by the formula:

$$U = (S - R)/R$$

In that formala, U is the percent of unresolved recovery (which may be more than 100), S is the diameter of the substrate about which the sleeve is to be recovered and R is the diameter to which the sleeve would recover if unrestricted. Inasmuch as a sleeve is always recovered about a substrate so that some unresolved recovery remains, the joint of the sleeve remains in tension at all times. Therefore, at high levels of unresolved recovery, considerable forces may be exerted which tend to delaminate the bond. The length of the panel which will be required to withstand these forces can be readily determined by those skilled in the art. However, we have found that a panel having a coating at least 0.005 inches of the preferred adhesive composition described above will be adequate for most purposes.

When in place, the panel is heated, for example, by means of a torch 26 as shown in FIG. 6 or by other suitable means, to render the adhesive composition tacky and pressed into firm contact with the sheet material. Initial adhesion to the sheet material can be provided by pressure sensitive tape described above. Any other suitable means, for example, clamping means, may also be employed. When the pressure sensitive tape is used, the strips should run in a direction transverse to the length of the sheet material, i.e., parallel to the overlapping ends. In this way, any slippage between the panel and the short material caused by recovery of the sheet material induced by heating the panel is reduced or eliminated. A fully assembled bond is shown in FIG. 6.

The invention described above provides a very convenient method for making and installing heat-recoverable sleeves in the field. The laminar panel used can be cut to the desired length and width from a roll of the material. The pressure sensitive tape, if used, can be readily applied as a strip taken from a roll of the material and applied as needed. The length of heat recoverable material used for the sleeve can also be cut to the desired length and width from a roll of material. Thus, by means of the present invention, the need for having on hand a variety of sleeves sizes can be reduced.

We claim:

1. An article of manufacture comprising:
   (a) a polymer layer having associated therewith a reinforcing member and
   (b) an adhesive coating comprising a mixture of a normally adhesive heat softenable polymer and an aromatic tackifier, said coating being on one surface of said reinforced polymer layer said reinforced polymer and said adhesive polymer having been crosslinked.

2. An article according to claim 1 wherein said adhesive polymer is a copolymer of ethylene and at least one monoolefinically unsaturated polar comonomer.

3. An article according to claim 2 wherein the comonomer is selected from monoolefinically unsaturated acids, vinyl esters of alkanoic acids, vinyl esters of aromatic acids, alkyl esters of monoolefinically unsaturated acids and aryl esters of monoolefinically unsaturated acids.

4. An article according to claim 3 wherein the tackifier is a phenol modified coumarone-indene resin.

5. An article according to claim 4 wherein the adhesive polymer is a copolymer of ethylene and ethyl acrylate.

6. An article according to claim 5 crosslinked by ionizing radiation.

7. An article according to claim 6 crosslinked by from about 5-30 megarads of ionizing radiation.

8. An article according to claim 1 crosslinked by ionizing radiation.

9. An article according to claim 1 wherein the reinforcing member is a foraminous member.

10. An article according to claim 9 wherein said foraminous member is a woven cloth.

11. An article according to claim 10 wherein said cloth is glass cloth.

12. An article according to claim 1 wherein said reinforced polymer layer comprises a laminant of the reinforcing member between two polymer sublayers.

13. An article according to claim 12 wherein said reinforcing member is woven glass cloth.

14. An article according to claim 12 wherein said sublayers are layers of polyethylene.

15. An article according to claim 12 crosslinked by ionizing radiation.

16. An article according to claim 1 further comprising bands of pressure sensitive tape coated on said adhesive layer along parallel edges of said article.

* * * * *